(12) United States Patent
Barker

(10) Patent No.: US 6,453,220 B1
(45) Date of Patent: Sep. 17, 2002

(54) LOW EARTH ORBIT SATELLITE CONSTELLATION STATIONKEEPING ALGORITHM WITH ABSOLUTE ALTITUDE CONTROL

(75) Inventor: Lee A. Barker, San Jose, CA (US)

(73) Assignee: Space Systems/Loral, Inc., Palo Alto, CA (US)

(*) Notice: Subject to any disclaimer, the term of this patent is extended or adjusted under 35 U.S.C. 154(b) by 0 days.

(21) Appl. No.: 09/493,595

(22) Filed: Jan. 31, 2000

(51) Int. Cl.$^7$ ............................. G05D 1/00; G06F 7/00
(52) U.S. Cl. ............................. 701/3; 701/1-4; 701/13; 701/226; 701/300
(58) Field of Search .................. 701/1–4, 13, 226, 701/300

(56) References Cited

U.S. PATENT DOCUMENTS

| | | | | |
|---|---|---|---|---|
| 4,809,935 A | * | 3/1989 | Draim | 244/158 R |
| 4,854,527 A | * | 8/1989 | Draim | 244/158 R |
| 4,964,340 A | * | 10/1990 | Daniels et al. | 102/377 |
| 5,582,367 A | * | 12/1996 | Castiel et al. | 244/158 R |
| 5,845,206 A | * | 12/1998 | Castiel et al. | 455/13.4 |
| 5,957,409 A | * | 9/1999 | Castiel et al. | 244/158 R |
| 5,961,077 A | * | 10/1999 | Koppel et al. | 244/158 R |
| 6,102,335 A | * | 8/2000 | Castiel et al. | 244/158 R |

OTHER PUBLICATIONS

"Station Keeping Strategies for Constellations of Satellites", Alain Lamy and Stephane Pascal, Advances in the Astronautical Sciences, vol. 84, American Astronautical Society, Jan. 1993.

"Automatic Maneuver Planning for Maintenance of Satellite Constellation Geometry", Peter Brodsky, Lockheed Martin Space Mission Systems & Services.

* cited by examiner

Primary Examiner—William A. Cuchlinski, Jr.
Assistant Examiner—Ronnie Mancho
(74) Attorney, Agent, or Firm—Kenneth W. Float

(57) ABSTRACT

An easily implementable satellite constellation stationkeeping algorithm for maintaining the relative positioning among satellites of a low earth orbit constellation with minimal maneuvering while maintaining the constellation altitude over the effects of atmospheric drag. The satellite constellation stationkeeping algorithm may be implemented as a system or method that uses atmospheric drag perturbations to extend the stationkeeping cycle of the satellites in the low earth orbit constellation while simplifying the implementation algorithm and performing minimal maneuvers. In an exemplary satellite constellation stationkeeping algorithm, a plurality of satellites or a ground station are configured with a controller that implements an absolute altitude control algorithm. The plurality of satellites are launched into a respective plurality of slots of a low earth orbit. The orbital position of each satellite is controlled using the absolute altitude control algorithm such that each satellite is allowed to drift to or near the edge of a positional box that defines its slot, and the altitude of each satellite is selectively driven to a fixed target altitude which is a function of position and drag, using one or more thrusters for example, to reverse the satellite drift in its slot. During normal operating conditions, the orbital position of each satellite is controlled using only posigrade thrusting implemented by the thrusters.

10 Claims, 6 Drawing Sheets

Attitude Deviation vs. Time - Relative Altitude Control with Feedback

ArgLat Deviation vs. Time - Relative Altitude Control with Feedback

Attitude Deviation vs. Time - Absolute Altitude Control

Height vs. ArgLat Deviation - Absolute Altitude Control

Argument of Latitude Deviation (deg)
Decay rate 0.33 meters per day

Height vs. ArgLat Deviation - Absolute Altitude Control

Argument of Latitude Deviation (deg)
Decay rate 0.5 meters per day

Altitude Deviation vs. Time - Absolute Altitude Control

ArgLat Deviation vs. Time - Absolute Altitude Control

Height vs. ArgLat Deviation - Absolute Altitude Control
Decay rate 0.1 meters per day

LOW EARTH ORBIT SATELLITE CONSTELLATION STATIONKEEPING ALGORITHM WITH ABSOLUTE ALTITUDE CONTROL

BACKGROUND

The present invention relates generally to stationkeeping systems and methods for controlling orbiting satellites, and more particularly, to a low earth orbit (LEO) satellite constellation stationkeeping system and method having absolute altitude control.

The following discussion compares two low earth orbit constellation stationkeeping strategies, the first where conventional relative altitude control is performed and, the second where absolute altitude control in accordance with the principles of the present invention is performed. The strategies are discussed with reference to only the low earth orbit regime because a measurable atmospheric drag perturbation is assumed to exist. The goal is to determine the simplest operationally useful constellation stationkeeping algorithm for implementation considering operational constraints such as maneuver windows and limits on maneuver burn durations or delta V's.

This discussion involves only in-plane stationkeeping maneuvers that control the altitude and argument of latitude of a given satellite within a constellation. Near circular orbits are assumed. Eccentricity control is assumed to be handled independently. That is not to say that eccentricity control is not performed simultaneously with these maneuvers, but rather, that placement of the maneuver with respect to argument of perigee for the purposes of eccentricity control will not be discussed here. Similarly, out-of-plane perturbations are assumed to be handled independently. These are valid assumptions in the Globalstar constellation developed by the assignee of the present invention.

Absolute control versus relative control. A first reference entitled "Station Keeping Strategies for Constellations of Satellites", by Alain Lamy and Stephane Pascal, Advances in the Astronautical Sciences, Vol. 84, American Astronautical Society, January 1993, states that:

"The first method for station keeping of constellations is to control each satellite independently of the others. Each satellite is kept in a box centered on nominal position, affected only by mean perturbations. As phasing with other satellites must be controlled, the mean movement must be the same for all the satellites in the constellation . . . the constellation keeps its properties over time.

The purpose of relative station keeping strategy is to control each satellite with respect to a "mean constellation" built upon actual positions of satellites at each time. This mean constellation has to:

have the same properties as nominal constellation (walker properties), be the closest to all satellites to minimize maneuver cost.

The idea of relative station keeping is to take advantage of global effects of perturbations that do not change the visibility criterion . . . "

Absolute control is required when strict requirements for phasing of orbits with the Earth's rotation exist, as is the case on many science missions, Relative control is preferred when such requirements are not imposed, rather only that the relationship between satellites is important. Such is the case for a low earth orbit communications satellite network where percent coverage is the primary criterion.

If a constraint on altitude is imposed on a low earth orbit constellation (due to licensing requirements, for example) while constraints on phasing with the Earth do not exist, then a unique situation arises. In this case, absolute control is required on constellation altitude while satellite positioning (argument of latitude) within the constellation can be maintained using relative control. Given some real operational constraints, such as limited finite sets of maneuver delta V and periodic maneuver windows, it can be shown that a strategy of absolute altitude control can provide the advantage of fewer maneuvers than a relative altitude control strategy over the life of the satellite. This advantage can be achieved with no greater complexity in algorithm implementation and may be computationally less intensive.

Relative altitude control. A second reference entitled "Automatic Maneuver Planning for Maintenance of Satellite Constellation Geometry", by Peter Brodsky, Lockheed Martin Space Mission Systems & Services, describes a method of constellation stationkeeping where relative control is used for in-plane and out-of-plane stationkeeping. Eccentricity and argument of perigee are not controlled in this scheme. These elements require separate maneuver strategies to account for deviations. This strategy described assumes the following.

(1) Target satellite slots (altitude and argument of latitude) are derived from mean positions of the actual satellites and deviations are derived from the difference of the actual position and the target slot. This is referred to as the deviation from mean deviation.

(2) The altitude is not held constant. Degradation of the constellation altitude due to atmospheric drag is allowed to occur over the life of the system. The algorithm does not attempt to correct for this.

(3) The algorithm follows a feedback control law. Time constants are set according to the desired stationkeeping cycle length.

(4) There is a basic assumption in the feedback control system algorithm that drag operates nearly equally on all the satellites in the constellation.

(5) There is no consideration for eccentricity control. Eccentricity control must be handled separately in maneuver planning.

(6) There is no consideration of minimum/maximum or a limited set of discreet pulse lengths for stationkeeping maneuvers. The control law allows any size delta V in its solution, no matter how small, regardless of physical system constraints or implementation complexity.

(7) Every epoch in time has a maneuver solution for every satellite in the constellation. This means that even immediately following a performed maneuver, a solution for a new maneuver can be produced for the same satellite. Additionally, any single maneuver performed upsets the solution for all other satellites in the constellation, thus requiring recalculation of all other maneuvers. A system designer must guard against an algorithm that produces more maneuvers than are required.

Theoretically, such a closed-loop feedback control system for stationkeeping could reduce the error rate term to nearly zero. This at first would appear to require only a small number of maneuvers over the life of the satellite. However, without some limits on maneuver times, what really results is not fewer maneuvers, but an infinite number of maneuvers growing ever smaller in magnitude. To limit this, maneuvers are only performed when it is necessary to remain in a stationkeeping "box".

While both stationkeeping strategies are technically similar in implementation complexity, absolute altitude control offers some advantages over relative altitude control. The present invention addresses this control strategy.

Accordingly, it would be advantageous to have a low earth orbit satellite constellation stationkeeping system or method having absolute altitude control.

SUMMARY OF THE INVENTION

The present invention provides for an easily implementable satellite constellation stationkeeping algorithm that may be implemented as a system, procedure, or method for maintaining the relative positioning among satellites of a low earth orbit satellite constellation with minimal maneuvering, while maintaining the constellation altitude over the effects of atmospheric drag. Exemplary absolute altitude control satellite constellation stationkeeping algorithms are implemented as follows.

A plurality of satellites are each configured with a controller, or a controller is provided on the ground at a ground station, that implement an absolute altitude control algorithm. The plurality of satellites are launched into a respective plurality of slots of a low earth orbit. The orbital position of each satellite is controlled using the controller and absolute altitude control algorithm such that the respective satellite is allowed to drift to or near the edge of a positional box that defines its slot, and the altitude of the satellite is selectively driven to a fixed target altitude, such as by using one or more thrusters, for example, to reverse the satellite drift in its slot. During normal operation, the orbital position of each satellite is controlled using only posigrade thrusting using the thrusters.

The satellite constellation stationkeeping algorithm makes use of atmospheric drag perturbations to extend the stationkeeping cycle of a satellite in the low earth orbit constellation while simplifying the implementation algorithm and performing minimal maneuvers. The present invention provides for a simple operationally-useful algorithm that implements low earth orbit constellation stationkeeping, considering operational constraints such as maneuver windows and limited maneuver burn durations.

The stationkeeping algorithms provide for reduced requirements for stationkeeping maneuvers. The stationkeeping algorithms provide for maintenance of the constellation altitude at no cost in maneuver cycle.

BRIEF DESCRIPTION OF THE DRAWINGS

The various features and advantages of the present invention may be more readily understood with reference to the following detailed description taken in conjunction with the accompanying drawings wherein like reference numerals designate like structural elements, and in which.

DETAILED DESCRIPTION

Figure 1:
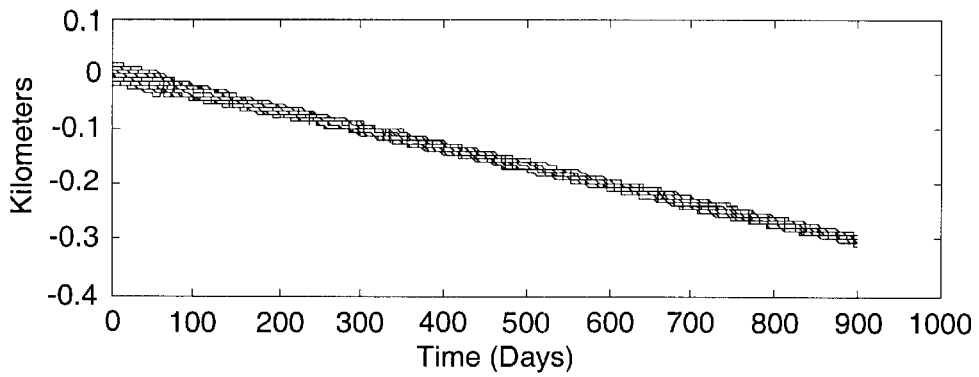
FIGS. 1 and 2 illustrate a relative control constellation stationkeeping algorithm on a fictitious constellation consisting of eleven satellites.
Figure 2:
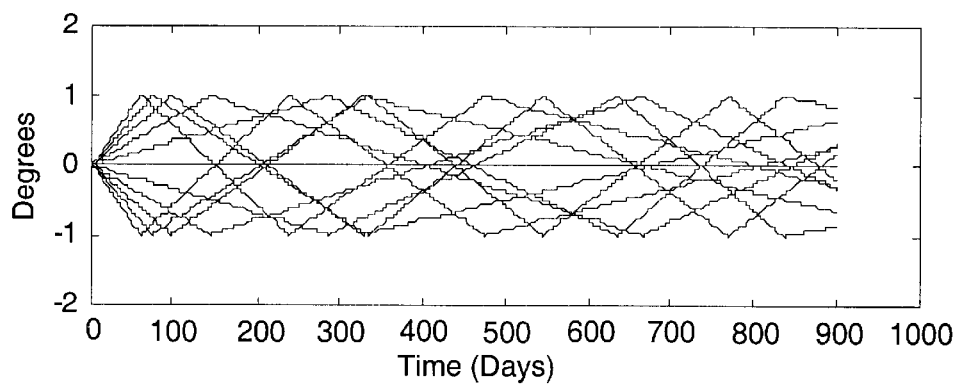

Referring to FIGS. 1 and 2 they illustrate a conventional relative control constellation stationkeeping algorithm on a fictitious constellation consisting of eleven satellites. FIG. 1 is a graph that illustrates altitude deviation versus time using conventional relative altitude control with feedback. FIG. 2 is a graph that illustrates ArgLat deviation versus time using conventional relative altitude control with feedback.

Initially, each satellite is assumed to be perfectly in its respective slot with an even spread in altitude deviation from twenty meters below the average altitude to twenty meters above the average altitude. Drag is assumed to act evenly over all satellites providing a reduction in altitude of ⅓ meter per day. This is a typical rate for a low earth orbit satellite in the middle of the solar cycle between 1000 and 1500 kilometers altitude. The control law used in this algorithm is a feedback controller described by the Brodsky reference where maneuvers are allowed when the satellite reaches the edge of its station "box".

This conventional relative stationkeeping algorithm produces a maneuver frequency of 1.7 maneuvers per year per satellite. The relative altitude error is not reduced to zero due to the fact that maneuvers are only allowed when the satellite reaches the edge of its station "box". Thus, the feedback equation always produces a drift rate back toward slot center. Also, the maneuver solution delta V magnitude is different for every case.

In order to minimize risk, it is often desirable to limit the number of procedures that are used in operations to a few that are tried and tested over time. By limiting the variability in commanding procedures, there is less risk of incorrect commanding that may cause an anomaly that interferes with the satellite's mission or even the loss of the satellite. Implementing the conventional relative algorithm involved creating a unique set of commands for each maneuver (although the only difference may be the burn duration).

Many other operational constraints may be present. These may include attitude control constraints restricting burn durations, minimum burn durations due to thruster efficiency issues, and algorithm complexity when merged with other system software.

Figure 3:
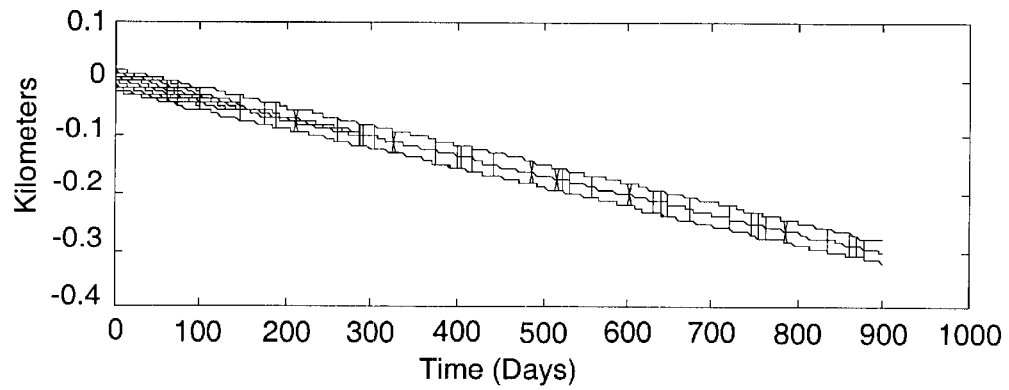
FIGS. 3 and 4 are graphs that illustrate the relative control constellation stationkeeping algorithm using a "bang-bang" controller.
Figure 4:
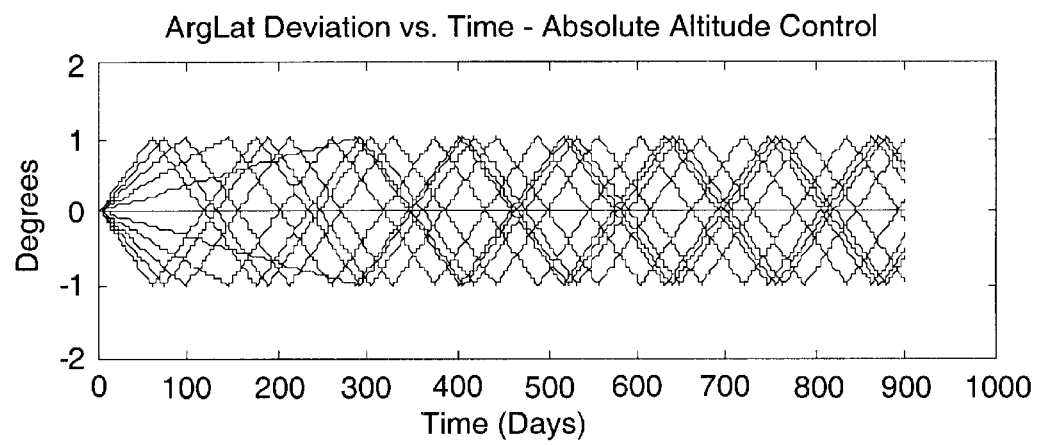

FIGS. 3 and 4 illustrate a conventional relative control constellation stationkeeping algorithm on the same fictitious constellation consisting of eleven satellites with the same initial conditions and assumptions as in the case discussed with reference to FIGS. 1 and 2. However, the control law used in this algorithm is a simple "bang-bang" controller that allows each satellite to drift to the edge of it's positional "box", then drives the altitude to twenty meters above or below the average altitude, as appropriate, to reverse the satellite drift in its slot.

The relative stationkeeping algorithm produces a maneuver frequency of 2.65 maneuvers per year per satellite.

While the number of maneuvers increased, the number of commands required is significantly reduced, in this case to only two, one to increase altitude by 40 meters, and one to decrease the altitude by 40 meters. There are bold assumptions in this statement however. Here it is assumed that (1) it is possible to create a single command for all satellites in the constellation that when executed achieve the same orbit altitude change and (2) that atmospheric drag acts evenly over all satellites in the constellation. The second assumption, while not necessarily true, may be approximately true. The first assumption may be difficult to apply when one considers that satellites that are identical in design and dry mass often have different thruster performance due to current tank pressures, temperatures, and the like. Absent these assumptions, a similar problem to that of the control feedback solution still exists, where the maneuver duration varies on each maneuver.

There are numerous implementation issues that arise from trying to use conventional relative altitude control algorithms for low earth orbit constellation satellite operations. These include the following.

(1) The algorithm may require integration with a scheduler to handle the fact that maneuvers are typically allowed only when orbit normal operations exist, such as when sun angles are below some value that orbit normal operations provide sufficient sunlight to the solar arrays.

(2) Because the solution is a result of the state of the constellation (the method of averaging), the performance of a maneuver, or planning of such maneuver, alters the outcome for all subsequent maneuvers. This leads to a time-consuming and iterative process of re-running maneuver planning software. Any reduction in complexity in this process would be an improvement.

(3) The spacecraft operations and command center (SOCC) must be wary of "outlier" satellites that get averaged into the solution, possibly resulting in more maneuvers than are really necessary. This requires a manual editing process in a weighting matrix to achieve the minimal maneuver solution.

(4) The SOCC must be wary of "noise" in orbit determination solutions fed to the constellation stationkeeping algorithm.

(5) The solution must account for eccentricity control in at least a simplified manner if such control is required.

(6) Some maneuvers can actually drive the constellation to a lower altitude. This, along with the natural decay of the constellation will, at some point in the future (typically years), potentially lead to issues regarding the license to operate at the lower altitude.

Additional implementation issues that may arise from trying to use conventional relative altitude control algorithms for low earth orbit constellation satellite operations include the following.

(1) The solution may need to account for the operational need to have minimum/maximum limits on the pulse duration or a limited set of pulse durations available for stationkeeping maneuver planning. These "discreet" pulse lengths, along with observed differential drag, limit the ability to reduce the altitude deviation of a satellite in the constellation to zero.

(2) An automated solution will not tolerate. "noise" in the orbit determination of more than about 10-20 meters. Noise levels greater than this will generate maneuver solutions that are incorrect and may cause algorithm stability problems.

(3) The solution must include a determination of an appropriate burn location in the orbit for the maneuver in order to maintain established eccentricity control.

Absolute altitude control. One way to reduce the complexity of the problem is to alter the basic stationkeeping algorithm to one where altitude is maintained. Such a strategy is implemented by the present invention and offers advantages over relative altitude control algorithms. These advantages include the following.

(1) Predictable drift cycles on individual satellites.

(2) Results in a well-defined drift cycle "path" in altitude and argument of latitude deviation.

(3) Fewer variables in the feedback solution for maneuver planning, resulting in faster computation. Specifically, the mean altitude, calculated from the altitudes of all satellites in the constellation, is replaced by a fixed target altitude. This reduces potential instabilities in a feedback system. While there is still a need for orbit determination accuracy with regard to semimajor axis, an error here will affect only the satellite with noisy data. It will not corrupt the solutions for the satellites with good semimajor axis estimates.

(4) Altitude is maintained over the life of the constellation.

(5) Potentially fewer maneuvers are required than with the relative altitude control algorithm. This is a result of the satellite's natural drift cycle when using a fixed altitude algorithm. For example, this cycle averages about 200 days for a ±1 ° stationkeeping box for a Globalstar satellite.

(6) The absolute altitude control algorithm, once established, requires only the use of a posigrade thruster set. This simplifies operations and design requirements.

(7) The absolute altitude control algorithm accounts for (and makes use of) atmospheric drag.

Additional specific advantages of the absolute altitude control algorithm include the following.

(1) Because altitude is maintained over the life of the constellation, the orbit definition for replacement or follow-on satellites is very well defined.

(2) It avoids questions as to icensing issues regarding constellation altitude.

(3) Stationkeeping maneuvers will take on a familiar "pattern" that should make operators confident in the maneuver plan when they see it generated.

Figure 5:
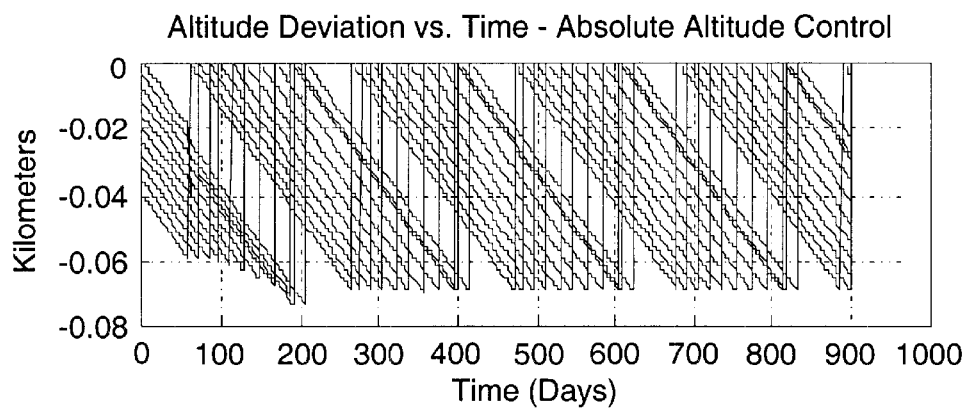
FIGS. 5 and 6 are graphs that illustrate an absolute altitude control constellation stationkeeping algorithm in accordance with the principles of the present invention.
Figure 6:
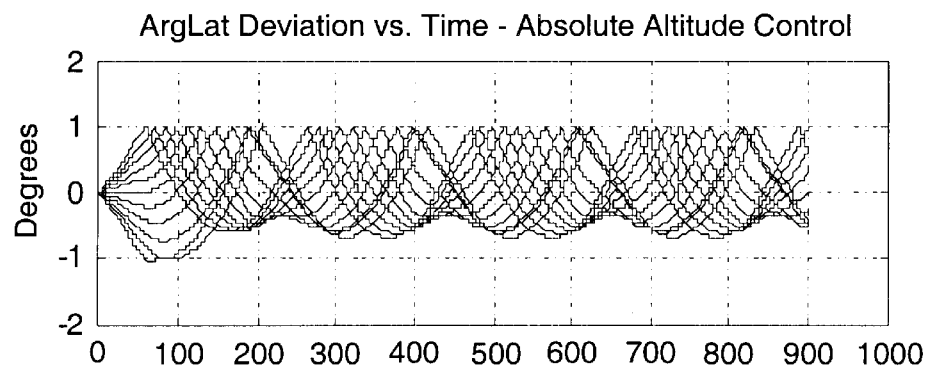
Figure 7:
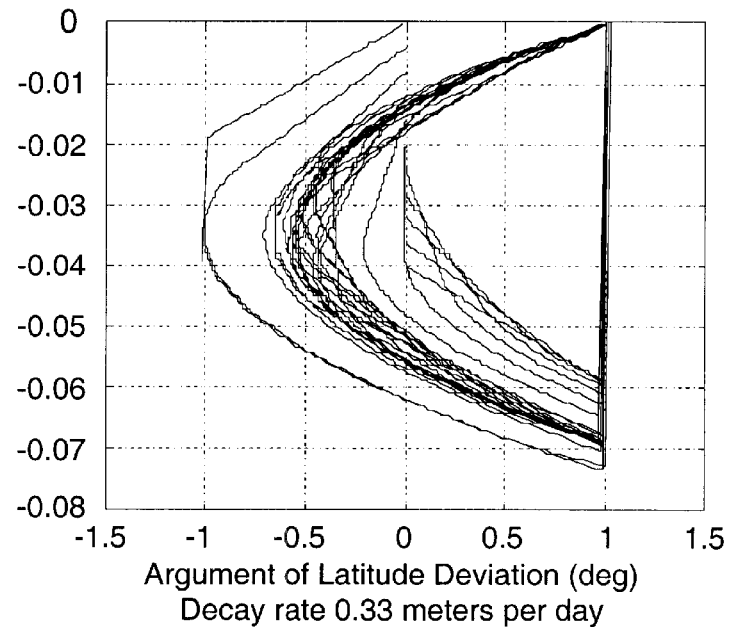
FIGS. 7 and 8 are graphs that illustrate two decay rates for the absolute altitude control constellation stationkeeping algorithm.

FIGS. 5, 6, and 7 are graphs that illustrate an exemplary absolute altitude control constellation stationkeeping algorithm in accordance with the principles of the present invention. The exemplary constellation stationkeeping algorithm uses the same fictitious constellation of eleven satellites with the same initial conditions and assumptions as in the previous cases. The control law used in the absolute altitude control algorithm uses a controller that allows each satellite to drift to the edge of it's positional "box", then drives the altitude to a fixed target altitude, which is a function of slot argument of latitude deviation and decay rate of the orbit, to reverse the satellite drift in its slot. Since the "cycle average" altitude remains below the cycle start target altitude, an argument of latitude drift cycle results. Once established in the stationkeeping cycle, the trailing edge of the "box" is never reached before atmospheric drag effects reduce the negative drift rate to zero and then accelerate it in the positive direction.

One advantage of the absolute altitude control algorithm is a well defined drift cycle "path" in absolute altitude and relative argument of latitude deviation as shown in FIG. 7. This path provides a clear altitude target for maneuvering regardless of when in the cycle the maneuver must occur. For example, if during the next maneuver window the satellite is not yet at the limit of its "box", but the satellite will drift beyond its "box" before the following maneuver window, it is easy to determine the change in altitude required to maneuver the satellite to the optimum point on the drift cycle path to renew the cycle. Since the "path" has some width (margin) to it, it is not necessary to propel the satellite to an exact point on the path, but only to the vicinity. This allows for the operational limits of pulse durations referred to previously. The altitude achieved may be above or below the target by up to half of the altitude change resolution.

Figure 8:
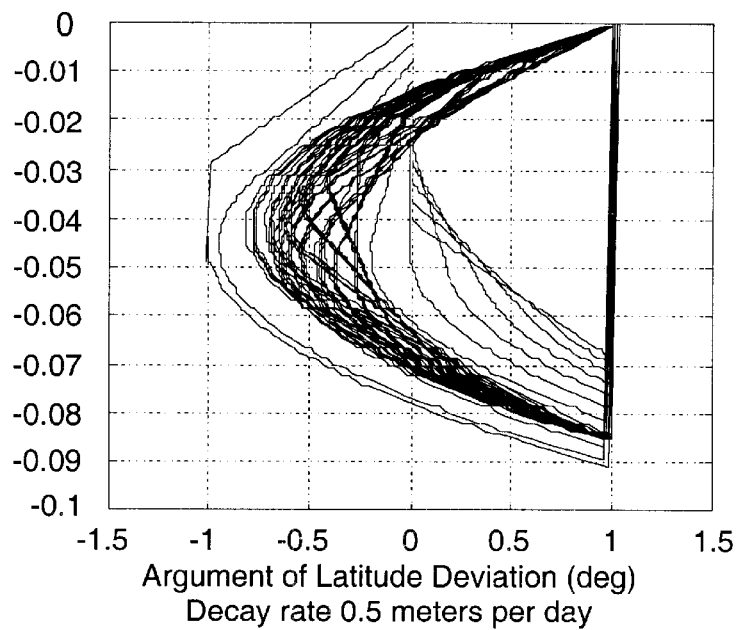

Another advantage of the absolute altitude control algorithm is that, under normal operations, only posigrade thrusting is required. This simplifies operations and stationkeeping control software since logic to determine whether a maneuver should be posigrade or retrograde is no longer required. Finally, the absolute altitude control algorithm works regardless of the orbit decay rate due to atmospheric drag by adjusting the target altitude. This is illustrated in FIGS. 7 and 8.

Figure 9:
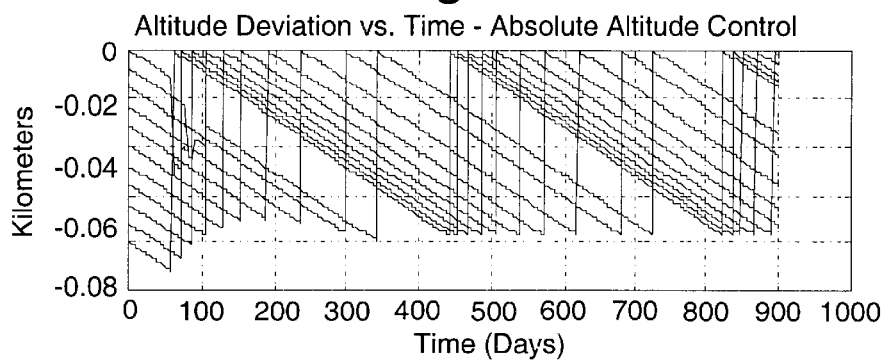
FIGS. 9 and 10 are graphs that illustrate two decay rates for a low drag case (orbit decay rate of 0.1 meters per day) for the absolute altitude control constellation stationkeeping algorithm.
Figure 10:
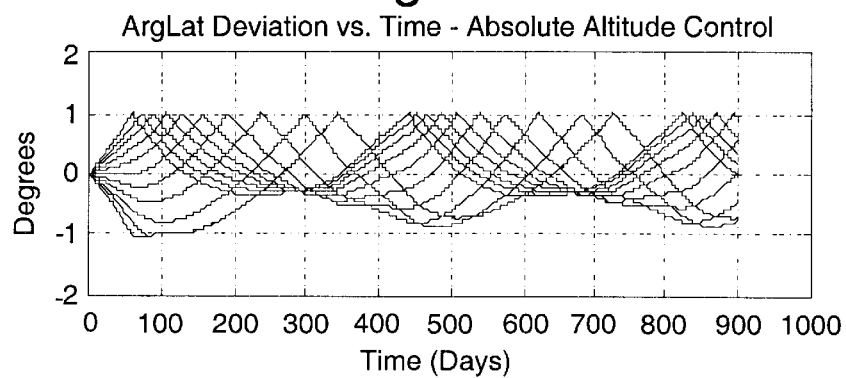
Figure 11:
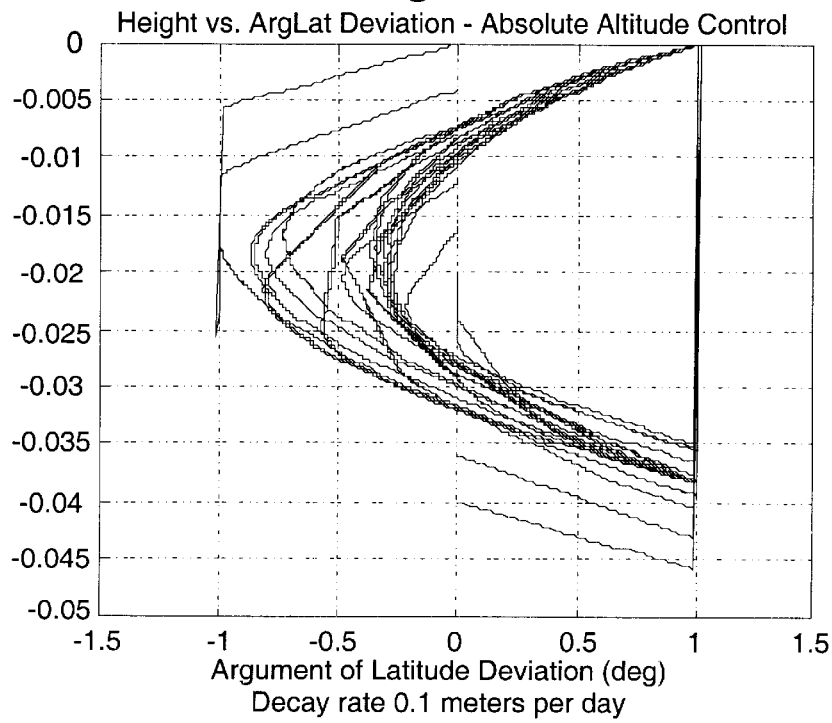
FIG. 11 is a graph that illustrates the height versus the argument of latitude deviation for the low drag case (orbit decay rate 0.1 meters per day) using the absolute altitude control constellation stationkeeping algorithm.

For a low drag case (orbit decay rate of 1/10 meter per day), the number of maneuvers is reduced to 1 per year per satellite for a ±1° stationkeeping box, for example. This is shown in FIGS. 9 and 10. The drift cycle in FIGS. 9 and 10 looks similar to the graphs shown in FIGS. 7 and 8. FIG. 11 is a graph that illustrates the height versus the argument of latitude deviation for the low drag case (orbit decay rate 0.1 meters per day) using the absolute altitude control constellation stationkeeping algorithm.

A comparison of the primary features of the relative and absolute altitude control strategies or methods is summarized in the following table:

| Method | Relative Altitude Control | Absolute Altitude Control |
| --- | --- | --- |
| Maneuver Frequency | 1.7–2.6 maneuvers/satellite/yr. (depends on burn duration limits, feedback controller and stationkeeping box width) | 1.03–2.5 maneuvers/satellite/yr. for Globalstar satellites (depends on orbit decay rate and stationkeeping box width) |
| Implementation Algorithm | Complex | Complex, but fewer variables |
| Altitude | Not maintained over life of satellite | Held constant over life of satellite |

Figure 12:
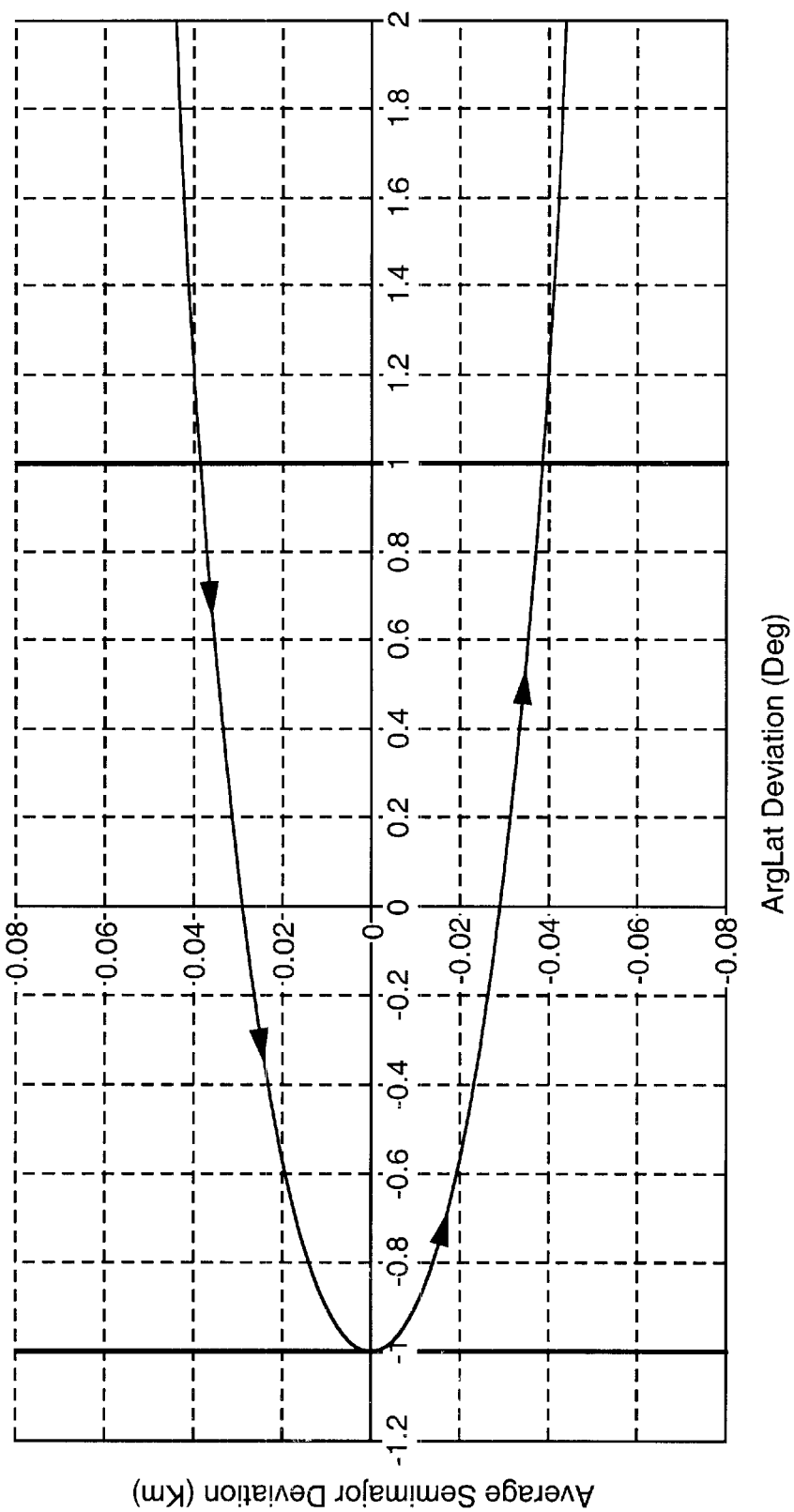
FIG. 12 is a graph that illustrates the stationkeeping cycle path in average semimajor deviation versus the argument of latitude deviation for a typical Globalstar satellite in the absolute altitude control stationkeeping cycle.

FIG. 12 is a graph that illustrates the stationkeeping cycle "path" in average semimajor deviation versus the argument of latitude deviation for a typical Globalstar satellite. The parabolic curve in FIG. 12 illustrates the nominal "path" of a Globalstar satellite in its stationkeeping cycle. In FIG. 12, the average constellation semimajor axis (which is held at a fixed altitude) is the x-axis (semimajor axis deviation=0), the argument of latitude or true anomaly deviation is measured along the x axis, the bold vertical lines represent the stationkeeping box limits for Globalstar satellites, and, if the station keeping cycle curve were to be described as a parabola, $(y=ax^2+b)$, the "a" term would be function of the orbit decay rate due to atmospheric drag. For a Globalstar satellite, the time from start of cycle (~35 meters up and at +1 degrees ArgLat deviation) to completion of cycle (~35 meters down and at +1 degrees ArgLat deviation) is roughly 200 days.

A stationkeeping maneuver window is available every ~50 days. When the satellite has drifted around in its cycle and crosses from the lower left hand quadrant to the lower right hand quadrant, it is now a candidate for stationkeeping maneuver on its next maneuver window. This may be as much as 50 days away or only a few days away. If it is several weeks out, then it will be close to the edge of the box and would be maneuvered to ~+35 meters semimajor axis deviation. If the window came up sooner, for example, and the satellite had only drifted out to 0.4 degrees ArgLat deviation, it would be targeted to maneuver to ~+30 meters semimajor axis deviation. The goal is to get on the nominal "path" for the longest period before the next maneuver is required.

Figure 13:
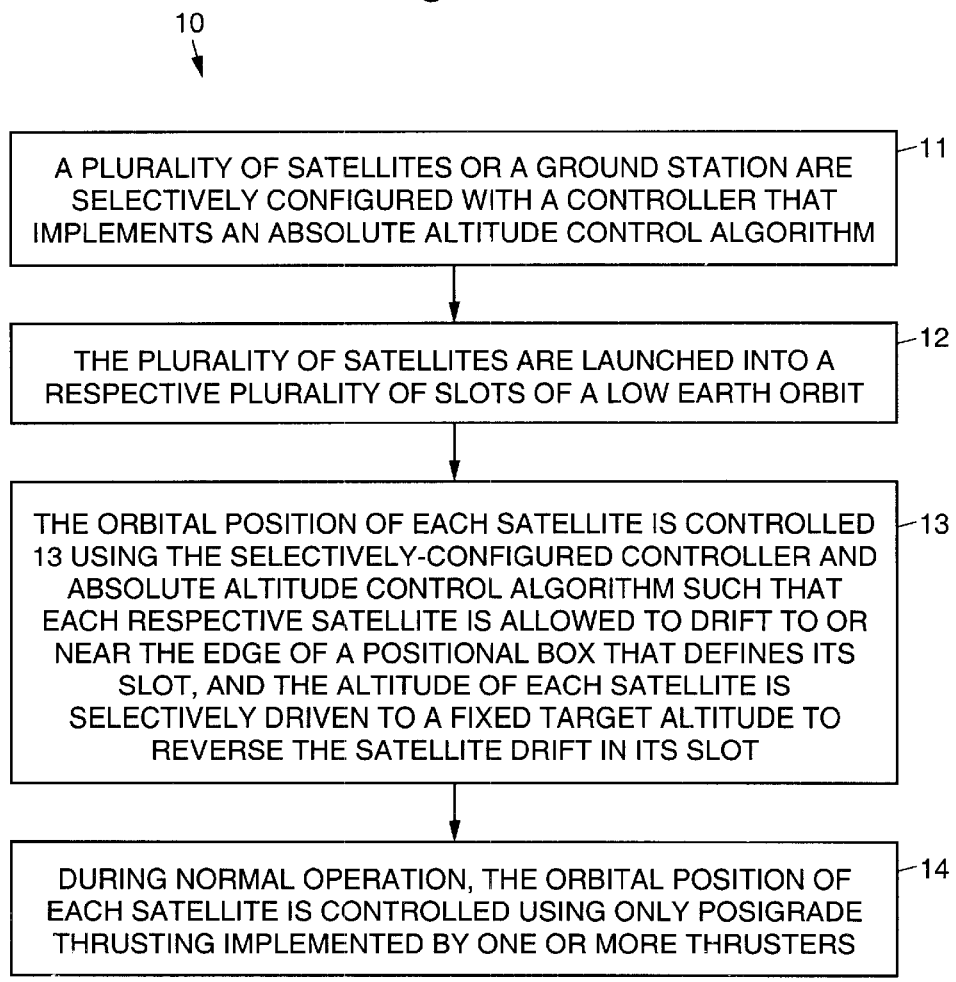
FIG. 13 is a flow chart that illustrates an exemplary absolute altitude control constellation stationkeeping algorithm in accordance with the principles of the present invention.

With the above in mind, and for the purposes of completeness, FIG. 13 is a flow chart that illustrates an exemplary absolute altitude control satellite constellation stationkeeping algorithm 10 in accordance with the principles of the present invention. The satellite constellation stationkeeping algorithm 10 may be implemented in the form of a system 10, a controller 10, a method 10 or a procedure 10. The exemplary satellite constellation stationkeeping algorithm 10 is as follows.

A plurality of satellites or a ground station are configured 11 with a controller that implements an absolute altitude control algorithm. The plurality of satellites are launched 12 into a respective plurality of slots of a low earth orbit. The orbital position of each satellite is controlled 13 using the controller and absolute altitude control algorithm such that the respective satellite is allowed to drift to or near the edge of a positional box that defines its slot, and the altitude of the satellite is selectively driven to a fixed target altitude, such as by using one or more thrusters, to reverse the satellite drift in its slot. Under normal operating conditions, the orbital position of each satellite is controlled 14 using only posigrade thrusting implemented by the thrusters.

Thus, an improved low earth orbit satellite constellation stationkeeping algorithm having absolute altitude control has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A low earth orbit satellite constellation stationkeeping system comprising:

a plurality of satellites or a ground station selectively configured with a controller that implements an absolute altitude control algorithm, which satellites are launched into a respective plurality of slots of a low earth orbit, and whose respective orbital positions are controlled using the selectively-configured controller and absolute altitude control algorithm such that each respective satellite is allowed to drift adjacent the edge of a positional box that defines its slot, and the altitude of each satellite is selectively driven to a fixed target altitude to reverse the satellite drift in its slot.

2. The system recited in claim 1 wherein the altitude of each satellite is selectively driven to the fixed target altitude using one or more thrusters.

3. The system recited in claim 2 wherein, during normal operating conditions, the orbital position of each satellite is controlled using only posigrade thrusting implemented by the thrusters.

4. The system recited in claim 1 wherein each of the plurality of satellites are configured with a controller that implements the absolute altitude control algorithm.

5. The system recited in claim 1 wherein the ground station is configured with a controller that implements the absolute altitude control algorithm.

6. A satellite constellation stationkeeping method comprising the steps of:
- selectively configuring a plurality of satellites or a ground station with a controller that implements an absolute altitude control algorithm;
- launching the plurality of satellites into a respective plurality of slots of a low earth orbit; and
- controlling the orbital position of each satellite using the selectively configured controller and absolute altitude control algorithm such that each respective satellite is allowed to drift adjacent the edge of a positional box that defines its slot, and the altitude of the satellite is selectively driven to a fixed target altitude to reverse the satellite drift in its slot.

7. The method recited in claim 6 wherein the altitude of each satellite is selectively driven to the fixed target altitude using one or more thrusters.

8. The method recited in claim 7 wherein, during normal operating conditions, the orbital position of each satellite is controlled using only posigrade thrusting implemented by the thrusters.

9. The method recited in claim 6 wherein each of the plurality of satellites are configured with a controller that implements the absolute altitude control algorithm.

10. The method recited in claim 6 wherein the ground station is configured with a controller that implements the absolute altitude control algorithm.

* * * * *